2,877,160

Patented Mar. 10, 1959

2,877,160

FERMENTATION PROCESS FOR THE PRODUCTION OF GLUTAMIC ACID

Donald A. Kita, Jackson Heights, N. Y., assignor to Chas. Pfizer & Co., Inc., New York, N. Y., a corporation of Delaware No Drawing. Application October 12, 1954
Serial No. 461,927

3 Claims. (Cl. 195—30)

This invention is concerned with a method for the production of glutamic acid by fermentation. In particular, it is concerned with the preparation of this amino acid from the corresponding keto acid, $\alpha$-ketoglutaric acid, by a fermentation process.

It is known to convert $\alpha$-ketoglutaric acid to $dl$-glutamic acid by hydrogenation of $\alpha$-ketoglutaric acid in the presence of ammonia. However, this process has the disadvantage of producing a racemic compound when it is often desired to have the optically-active, naturally-occurring form of the amino acid. It has also been reported that glutamic acid in its optically-active form is prepared by a transamination reaction in the presence of certain microorganisms or enzyme systems thereof, when such are contacted with mixtures of $\alpha$-ketoglutaric acid and certain $\alpha$-amino acids.

It has now been found that $\alpha$-ketoglutaric acid when brought into contact with a variety of organisms in the presence of the simple, inexpensive compound, urea, as the principal or only source of nitrogen, is converted to the normal, naturally-occurring, optically-active form of glutamic acid. Not only is the keto acid converted to the amino acid utilizing urea as the sole source of nitrogen, or in conjunction with other simple nitrogen compounds such as nitrates or ammonium salts, but the conversion takes place with considerable rapidity and often with high yields. The process is one which lends itself to operation on a large scale for the economic production of $d$-glutamic acid. (This compound is now more generally designated as L(+) glutamic acid.) This compound is, of course, of appreciable value as a flavoring agent or as an adjunct which brings out desirable flavors in a variety of edible materials.

It has been found that a great variety of fungi are effective for converting $\alpha$-ketoglutaric acid to glutamic acid utilizing urea as the sole of principal source of nitrogen for the reaction. These organisms include members of the orders Phycomycetes, Ascomycetes, Actinomycetes, and Fungi Imperfecti. Not all species of each of these groups are effective in bringing about a good conversion of the keto acid to an amino acid. However, in general, a high proportion of all of the species of each of the above groups is effective for this purpose. It is relatively easily determined whether a given strain of an organism is useful for this purpose. The process may be operated on a small scale in suitable flasks or metal vessels and the resulting product may be isolated to determine the conversion of the keto acid to the amino acid. Alternatively, quantitative tests may be applied to the reaction product to measure the amount of conversion without actually isolating the product.

The process of this invention is conducted by seeding a sterile nutrient medium containing urea and $\alpha$-ketoglutaric acid with a suitable transaminating microorganism and conducting the fermentation process under submerged aerobic conditions, that is, after seeding the sterile mixture with the culture of the chosen organism, the mixture is stirred and aerated until an appreciable conversion of the ketoglutaric acid to glutamic acid has taken place. The process is conducted at a temperature of from about 23° to about 32° C. The mixture is aerated at a rate of from about one-half to about three volumes of air per volume of medium per minute. The mixture is stirred with an agitator of appropriate design at a rate of several hundred revolutions per minute or more. In general, the process is completed in a period of from one to four days. The product may then be isolated by filtration of the mycelium and extraction of the product with partially immiscible polar organic solvents at an appropriate pH or by precipitation in the form of water-insoluble compounds from the reaction mixture. Conversions of $\alpha$-ketoglutaric acid to glutamic acid of 50% or more are normally obtained with many of the better organisms. By selection of the organisms it is possible to obtain appreciably higher yields. It is advisable to use a concentration of urea on the order of about 0.1 to five percent by weight in the reaction medium. The $\alpha$-ketoglutaric acid is also used in concentrations of this order.

A variety of materials may be utilized as components of the media used in the fermentation process of the present invention. These includes such materials as sugars, e. g. sucrose, glucose, lactose, and crude carbohydrate sources such as molasses, corn syrup, and so forth. Other carbohydrate sources such as starches of various kinds, e. g. potato, corn, wheat, and other types, may also be used. A variety of crude sources of growth substances such as distiller's solubles, cornsteep liquor, and protein hydrolyzates of various types are also useful. In some cases it is advisable to add salts such as sodium chloride, magnesium sulfate, potassium sulfate and sources of trace metals. This is particularly true when crude materials containing appreciable proportions of salts are not utilized in the fermentation media. A variety of vegetable meals may also be used in place of or in addition to the components listed above. These include such materials as soybean meal, peanut meal, cottonseed meal, and other substances of this nature. Various animal products are also of some value. In addition to protein hydrolyzates various forms of tankage, dried blood and so forth may be used. Although a certain amount of nitrogen may be furnished by these materials, urea is the most convenient and valuable nitrogen source for this process.

As indicated above, a variety of fungi are effective in conducting the process of the present invention. These include Fungi Imperfecti, such as the Aspergilli, such as *A. niger*, *A. wentii*; Cephalosporium; Threlaviopsis sp.; Stachybotrys sp. such as *S. atra*; and a number of others. A number of Ascomycetes have also been found to be quite effective in the process of the present invention. These include species of Endothia sp., such as *E. viridostroma*; Apioporthe sp., such as *A. corni*; Endoconidiophora sp., such as *E. adiposa*. Various Phycomycetes have been tested and found effective in the present process. These include species of Syncephalastrum such as *S. racemosum* and species of Absidia such as *A. glauca*. A variety of Actinomycetes have been found effective for the same process.

Cultures of many of the above organisms may be obtained from various public culture collections. Furthermore, various strains may be isolated from soil and other natural materials for use in the present process. These organisms may be maintained on slants of nutrient laboratory type media, such as Emerson's agar. The growth may be removed from the surface of such media and placed in sterile liquid nutrient media in small glass flasks for the cultivation of inoculum or for the operation of the present process on a small scale. These flasks may be stoppered with sterile cotton and shaken at a suitable temperature for a period of from one to five days. The cultivated organism may then be utilized for the inoculation of larger flasks or for glass or metal vessels of suitable design containing larger quantities of nutrient medium. In turn, after growth has been established in such equipment, the growth may be utilized for the inoculation of large scale fermentation vessels. In general, at least about 5 percent by volume of inoculum is used in starting the fermentation. With certain organisms, a higher proportion may be found advisable in order to obtain a rapid fermentation with economic production of glutamic acid. In some cases, it has been found advisable to cultivate the organism for from 12 to 30 hours before the addition of the keto glutaric acid and urea. This assures a rapid conversion of the keto acid to the amino acid under the best conditions. Alternatively, the organism may be cultivated and an enzyme or enzymes may be isolated in crude or purified form from the cultivated organism for use in conducting the transamination process in the presence of urea.

The enzyme or enzymes which are useful for the present process may be isolated from the cultures of the organisms by mechanically breaking the cell walls of these organisms or by subjecting the organisms to autolysis. The cell residues may then be removed, for example by filtration or centrifugation, and the enzyme may be utilized as a crude aqueous solution or may be isolated in more concentrated form by the addition to the aqueous solution of various agents which cause separation of the solid enzyme. This includes various water-soluble inorganic salts, such as ammonium sulfate, and various water-soluble polar organic solvents, such as acetone, ethanol, methanol, isopropanol, etc. The isolated enzyme system may be reconstituted by addition to water and the conversion of keto glutaric acid to glutamic acid may be conducted with the sterile aqueous solution after addition of urea. The reaction is conducted under aerobic conditions, for instance, in flasks stoppered with cotton or in vessels in which the medium is aerated and agitated. In general, this process is complete within from about 12 to about 70 hours.

The progress of the process described and claimed in the present application may be most readily followed by removing from the reaction mixture at periodic intervals samples of the mixture which are then analyzed for glutamic acid content. One convenient method for effecting such an analysis is to apply a sample of the product to a strip of filter paper utilizing the paper chromatography technique. A solvent system which has proven particularly effective is a mixture of one volume of glacial acetic acid, five volumes of butanol and five volumes of water. After development of the chromatogram, it is dried and sprayed with a dilute ninhydrin solution. Upon heating the paper strip, the presence of glutamic acid may be determined. By utilization of standard samples of glutamic acid of known concentration, it is possible to estimate with some degree of accuracy the proportion of keto glutaric acid that has been converted to glutamic acid.

To summarize, the present invention is a process for converting $\alpha$-keto glutaric acid to glutamic acid utilizing urea as the principal or sole nitrogen source in the medium and utilizing the transaminating activity (in the form of the living organism or in the form of an enzyme preparation) of a strain of fungi of a species capable of such transamination. Utilizing the information given above, it is relatively simple to test on a small scale any strain of a fungus to determine whether the organism is capable of carrying out the present process.

The following examples are given by way of illustration only, and are not intended as a limitation on the scope of this invention. In fact, as many widely varying embodiments are possible without departing from the spirit and scope of the herein described invention, it is to be understood that this invention is to be limited by the specific wording of the appended claims only.

Example I

A fermentation medium was prepared containing 4% by weight of distiller's solubles and 0.2% by weight of corn steep liquor. The medium was adjusted to pH 7.0 with potassium hydroxide. After sterilization, the medium was inoculated with a species of Phoma. The mixture was stirred and aerated at a temperature of 28° C. for 24 hours. At that time, 0.5% by weight of urea and 0.5% by weight of $\alpha$-ketoglutaric acid were added to the mixture under sterile conditions. Aeration and stirring was continued at 28° C. for a period of 60 hours. After the fermentation was completed, the product was isolated by one of the conventional methods described in the chemical literature. For instance, the filtered fermentation broth is passed over a column of acid washed alumina. The amino acid is adsorbed. The column is washed with a small volume of water and the product is eluted with 1 N hydrochloric acid. The pH of the eluate is adjusted with sodium hydroxide to pH 3.2 and the mixture is concentrated. Sodium chloride is filtered as it separates and after its removal, crystalline glutamic acid separates and is filtered. Its identity was clearly established as d-glutamic acid.

Example II

The process described in Example I was repeated utilizing a strain of *A. niger*. Comparable results were obtained.

Example III

The process of Example I was repeated utilizing a strain of *Endothia viridostroma*. d-Glutamic acid was isolated from the fermentation product.

What is claimed is:

1. In a process for the preparation of glutamic acid by subjecting $\alpha$-ketoglutaric acid under submerged aerobic conditions to the transaminating activity of a transaminating strain of fungus in an aqueous medium, the improvement which comprises conducting the reaction in the presence of urea as the principal nitrogen source.

2. A process as claimed in claim 1 wherein the transaminating fungus is grown in a fermentation medium containing urea, a source of carbohydrate and $\alpha$-ketoglutaric acid.

3. A process as claimed in claim 1 wherein the process is conducted with the isolated cell-free enzyme system of the transaminating strain of fungus.

References Cited in the file of this patent

UNITED STATES PATENTS

| | | |
|---|---|---|
| 2,394,031 | Waksman et al. | Feb. 5, 1946 |
| 2,749,279 | Smythe et al. | June 5, 1956 |

OTHER REFERENCES

"Chemistry and Industry," February 28, 1948, by E. Gale, p. 131.

Jour. Biological Chemistry, vol. 187, 1951: Cammarata et al., pp. 439–451; Feldman et al., pp. 821–830.